United States Patent
Tang et al.

(10) Patent No.: US 11,188,792 B2
(45) Date of Patent: Nov. 30, 2021

(54) DEFECT DETECTION USING MULTIPLE MODELS

(71) Applicant: International Business Machines Corporation, Armonk, NY (US)

(72) Inventors: Peng Tang, Beijing (CN); Yan Wang, Beijing (CN); Chi Xu, Beijing (CN); Jiang Tao Wang, Beijing (CN); Chang Shun Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 16/735,919

(22) Filed: Jan. 7, 2020

(65) Prior Publication Data

US 2021/0209414 A1 Jul. 8, 2021

(51) Int. Cl.
*G06K 9/62* (2006.01)

(52) U.S. Cl.
CPC ........... *G06K 9/6257* (2013.01); *G06K 9/624* (2013.01); *G06K 9/6268* (2013.01); *G06K 2209/19* (2013.01)

(58) Field of Classification Search
None
See application file for complete search history.

(56) References Cited

U.S. PATENT DOCUMENTS

| | | | | |
|---|---|---|---|---|
| 10,467,526 | B1* | 11/2019 | Appalaraju | G06K 9/4619 |
| 2018/0136145 | A1 | 5/2018 | Bryant et al. | |
| 2019/0205620 | A1* | 7/2019 | Yi | G06K 9/00268 |
| 2020/0104721 | A1* | 4/2020 | Mori | G06F 16/53 |
| 2020/0218971 | A1* | 7/2020 | Ustinova | G06N 3/0454 |

OTHER PUBLICATIONS

Shiina et al., "Defect Classification of Electronic Circuit Board Using Multi-Input Convolutional Neural Network", International Journal of Computer & Software Engineering, Published Sep. 19, 2018, vol. 3, 7 pages. https://www.graphyonline.com/archives/archivedownload.php?pid=IJCSE-137.

(Continued)

*Primary Examiner* — David Perlman
(74) *Attorney, Agent, or Firm* — Jeffrey M. Ingalls

(57) ABSTRACT

A method for generating training models includes generating a preliminary training model based on a group of first images, the first images including different types of objects; processing a group of second images with the preliminary model to generate a probability array for each of the second images, the probability array indicating likelihoods that an object is a particular type of object; generating correlations between the different types of objects based on the probability arrays; generating a plurality of object groups based on the correlations, where each object group includes a plurality of different types of objects that have a relatively low correlation with the other types of objects in the same object group; and for each object group, generating a final training model based on a group of third images, the third images each including an object having an object type corresponding to one of the object types.

20 Claims, 6 Drawing Sheets

(56) References Cited

OTHER PUBLICATIONS

Feng et al., "Fast and cost-effective in-process defect inspection for printed electronics based on coherent optical processing", Optics Express, vol. 26, No. 11, May 28, 2018, 12 pages. https://www.researchgate.net/publication/324703602_Fast_and_cost-effective_in-process_defect_inspection_for_printed_electronics_based_on_coherent_optical_processing.

Tanno et al., "Adaptive Neural Trees", Proceedings of the 36 th International Conference on Machine Learning, Long Beach, California, Jun. 9, 2019, 15 pages.

Sill et al., "Feature-Weighted Linear Stacking", arXiv:0911.0460v2 [cs.LG] Nov. 4, 2009, 17 pages.

\* cited by examiner

DEFECT DETECTION USING MULTIPLE MODELS

BACKGROUND

In the electronics manufacturing industry, it can be beneficial to detect small defects at different stages during the manufacturing process in order to adjust the equipment and/or the process itself, and to keep the loss rate of electronic device components low. Technologies exist that can detect or recognize certain objects (e.g., a defect on a microelectronic device) that are present in a given digital image. For example, software installed on a digital camera can recognize that objects, such as the human face or eyes, are present in an image captured by a sensor of the camera. More specific to the electronics industry, several methods of defect inspection have been developed including automated optical inspection (AOI), as well as manual visual inspection by an operator.

In general, AOI refers to an automated (or semi-automated) visual inspection of an electronics device (e.g., a printed circuit board (PCB), a liquid crystal device (LCD), a transistor, a bare silicon wafer, etc.) where a camera automatically scans the device for catastrophic failures (e.g., a missing component, voids, cracks, electrical shorts, etc.) and quality defects (e.g., a fillet size or shape, or component skew). AOI can be implemented at many stages throughout the manufacturing process, including bare wafer inspection, solder paste inspection (SPI), pre-reflow and post-reflow, PCB inspection, surface mounted technology (SMT) inspections, as well as other stages of manufacture. Generally, AOI systems utilize image processing and a machine vision algorithm to detect defects. However, with AOI systems, in at attempt to keep the loss rate of electronic devices low, the image processing and machine vision algorithm be configured to not reject devices that actually have a critical defect.

SUMMARY

Embodiments of the present disclosure relate to a method for generating training models for object detection. The method includes generating a preliminary training model based on a group of first images, the first images including a plurality of different types of objects. The method includes processing a group of second images with the preliminary training model to generate a probability array for each of the second images, the probability array indicating for each type of object the likelihood that an object in the respective second image is a particular type of object. The method includes generating correlations between the different types of objects based on the probability arrays. The method includes generating a plurality of object groups based on the correlations, where each object group includes a plurality of different types of objects, and each type of object in a given object group has a relatively low correlation with the other types of objects in the same object group. The method also includes for each object group, generating a final training model based on a group of third images, the third images each including an object having an object type corresponding to one the object types in the respective object group.

Other embodiments of the present disclosure are directed to a computer system and computer program product for performing the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

DETAILED DESCRIPTION

The embodiments described herein provide for methods, computer systems, and computer program products for generating training data for small object detection, that reduce the amount of image annotation information that must be processed when performing the training. The flowcharts and diagrams in the Figures illustrate these methods according to various embodiments. In some alternative implementations, the steps in the flowcharts may occur in a different order that that which is noted in the Figures.

Figure 1:
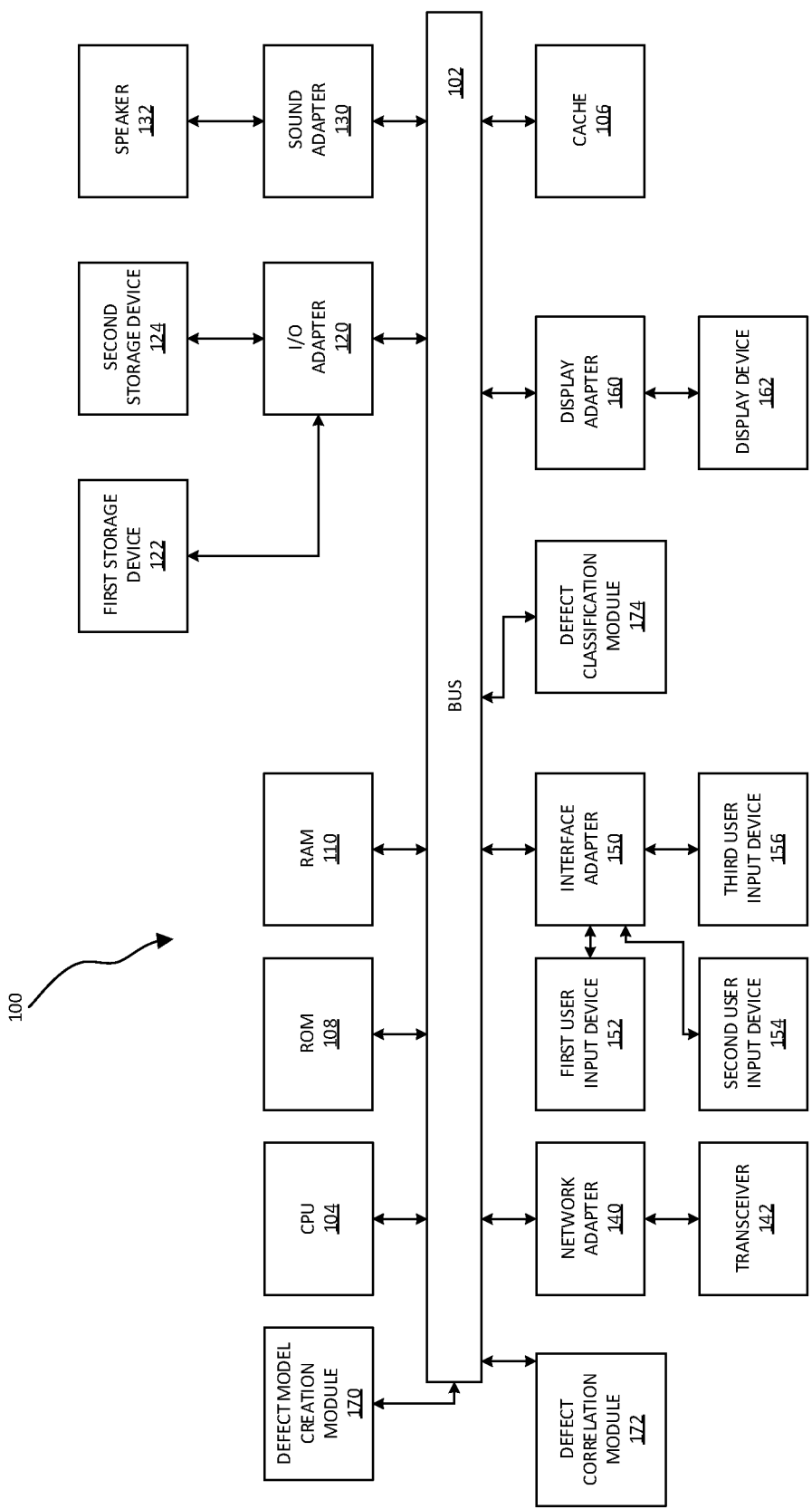
FIG. 1 is a block diagram of a processing system, according to embodiments.

Referring now to the drawings in which like numerals represent the same or similar elements and initially to FIG. 1, an exemplary processing system 100 to which the present embodiments may be applied is shown in accordance with one embodiment. The processing system 100 includes at least one processor (CPU) 104 operatively coupled to other components via a system bus 102. A cache 106, a Read Only Memory (ROM) 108, a Random-Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 may be any of a disk storage device (e.g., a magnetic or optical disk storage device), a solid-state magnetic device, and so forth. The storage devices 122 and 124 may be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 may be any of a keyboard, a mouse, a keypad, an image capture device, a motion sensing device, a microphone, a device incorporating the functionality of at least two of the preceding devices, or any other suitable types of input devices. The user input devices 152, 154, and 156 may be the same type of user input device or different types of user input devices. The user input devices 152, 154, and 156 are used to input and output information to and from system 100. In certain embodiments, a defect model creation module 170 is operatively coupled to system bus 102. In these embodiments, the defect model creation module 170 analyses a plurality of defect images to create a model that can be used to identify defects in an image. In certain embodiments, a defect correlation module 172 is operatively coupled to the system bus 102. In certain embodiments, a defect classification module 174 is coupled to the system bus 102. Functionality of the defect correlation module 172 and the defect classification module 174 are described in more detail below. Furthermore, it is to be understood that the defect correlation module 172 and the defect classification module 174 can be implemented, in some embodiments, by a processor, such as CPU 104, executing instructions.

The processing system 100 may also include other elements (not shown), as readily contemplated by one of skill in the art, as well as omit certain elements. For example, various other input devices and/or output devices may be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present disclosure provided herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

A cloud computing environment is service oriented with a focus on statelessness, low coupling, modularity, and semantic interoperability. At the heart of cloud computing is an infrastructure that includes a network of interconnected nodes.

Figure 2:
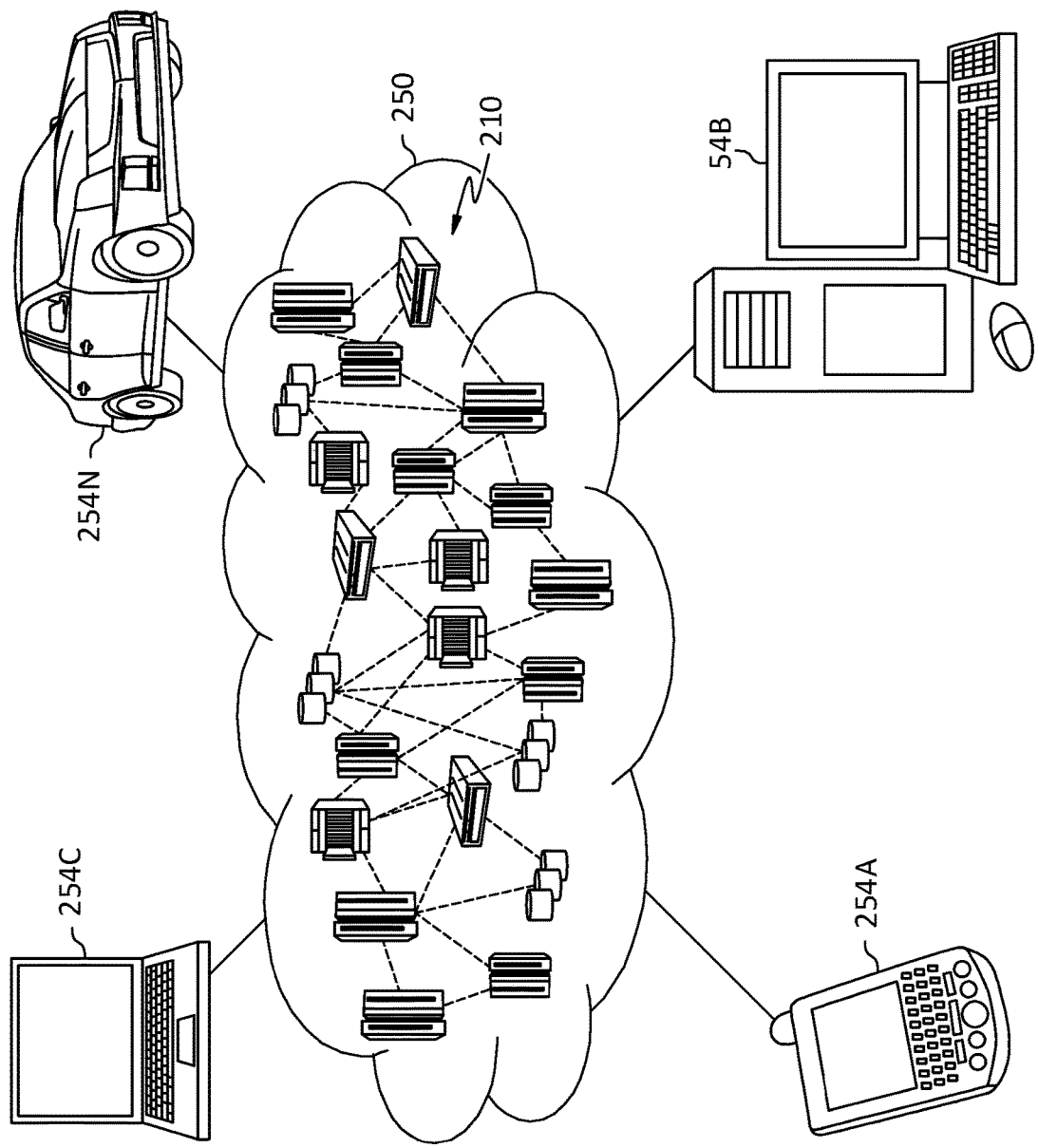
FIG. 2 is a block diagram of an illustrative cloud computing environment having one or more computing nodes with which local computing devices used by cloud customers to communicate, according to embodiments.

Referring now to FIG. 2, illustrative cloud computing environment 250 is depicted. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
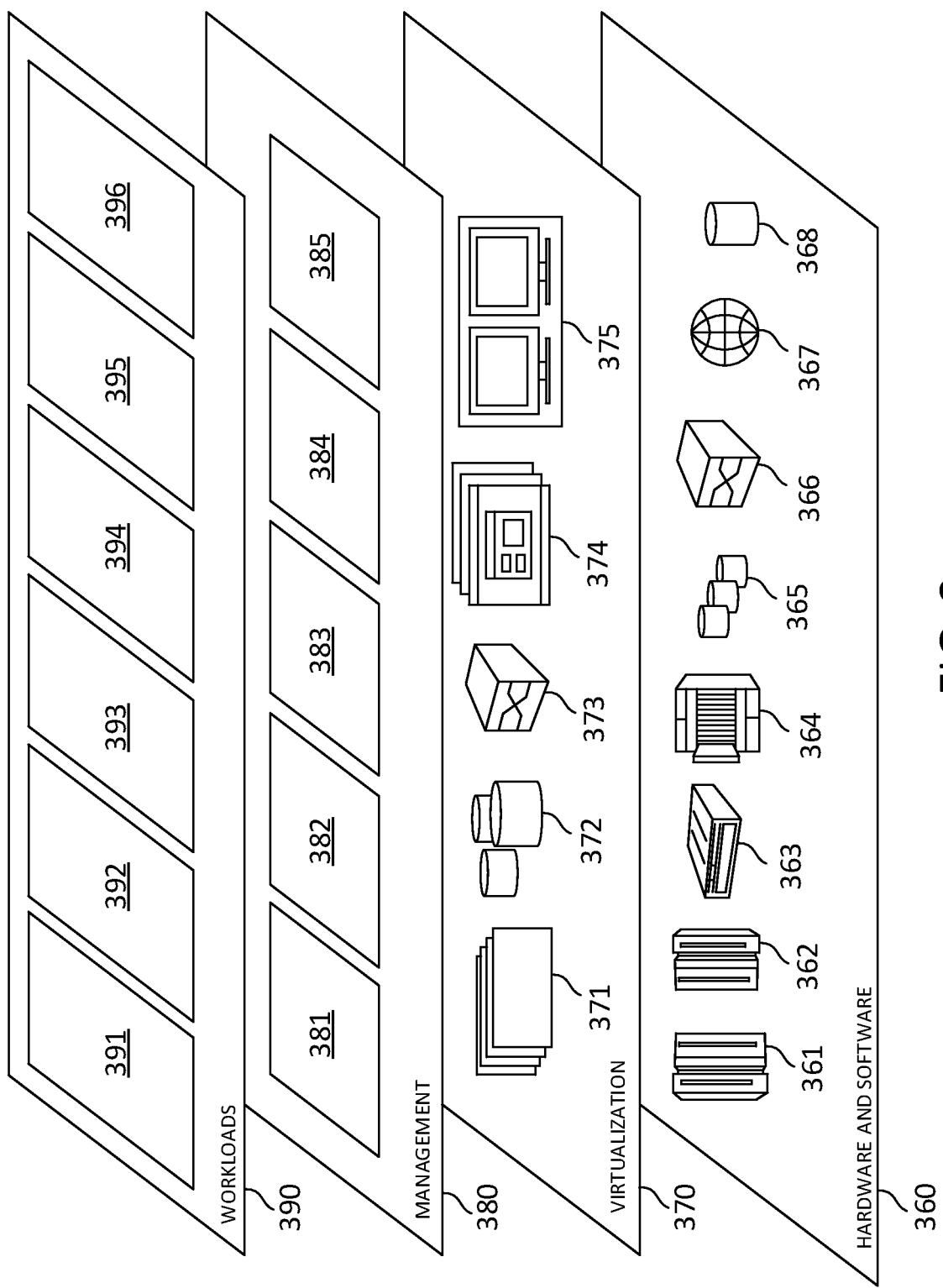
FIG. 3 is a block diagram of a set of functional abstraction layers provided by a cloud computing environment, according to embodiments.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture-based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and object detection training processing 396.

Figure 4:
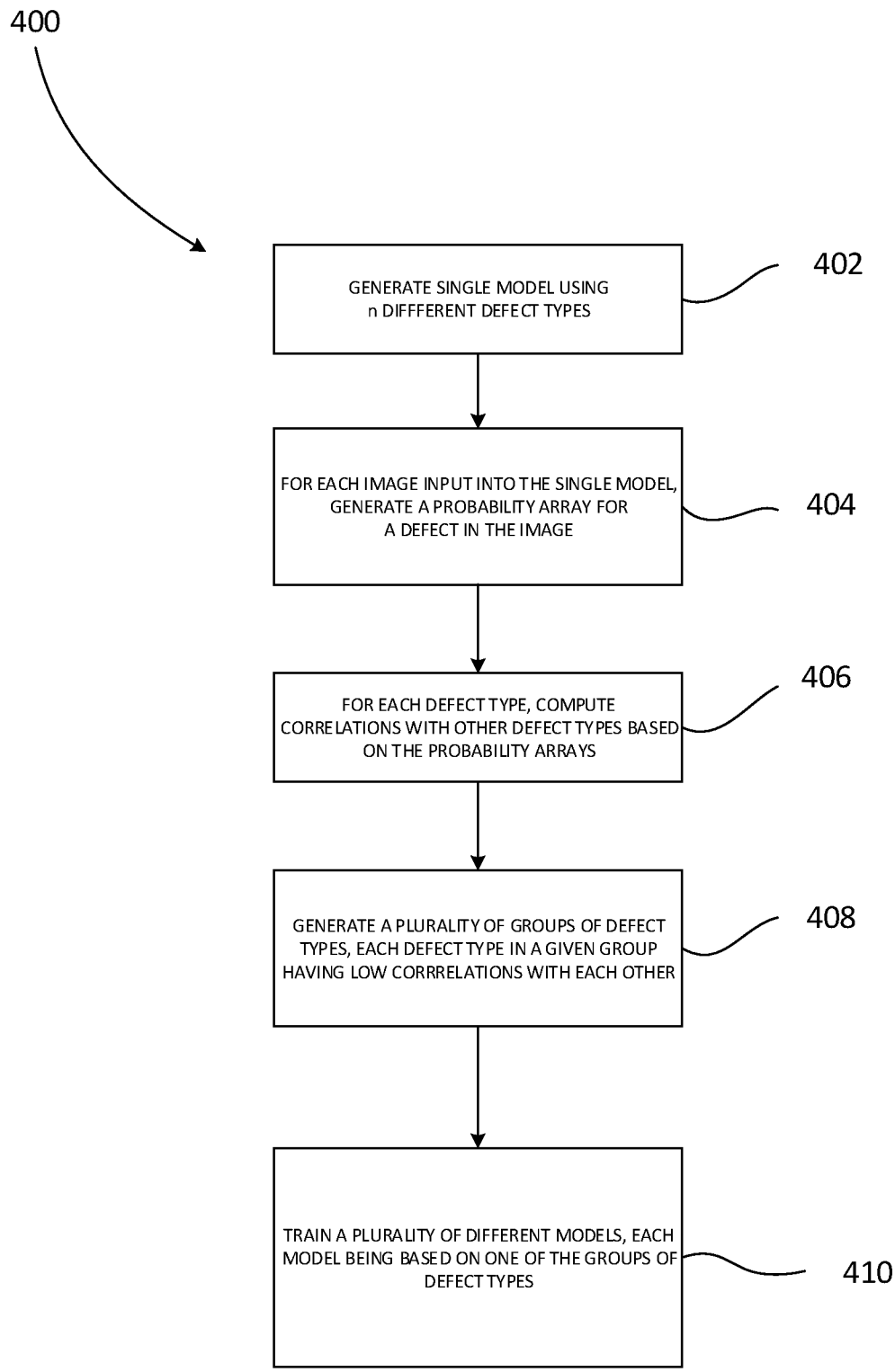
FIG. 4 is a block diagram for a method of generating multiple models for defect inspection, according to embodiments.

Referring now to FIG. 4, this figure shows a method for training a plurality of different models that are used for defect inspection, according to certain embodiments of a multi-model defect detection system 400. It is to be understood that one or more actions described with respect to FIG. 4 can be implemented by a processor, such as CPU 104, executing instructions. In step 402, a single model (or general preliminary training model) is created using a number of images containing different defects types. It should be appreciated that the number of defect types can be any suitable number. In step 402, the single model is generated (or trained) by inputting a number of images for each defect type. At this point, this single model can be used for defect inspection. However, by using only the single model, it is difficult to reach an acceptable industry loss rate (e.g., 200 defect parts per million (DPPM), or almost 99.98% acceptance).

In certain embodiments, neural networks and other deep learning modules are utilized to aide in training the defect inspection models. An Artificial Neural Network (ANN) (also referred to as a neural network) is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex, but on much smaller scales. A large ANN might have hundreds or thousands of processor units, whereas a mammalian brain has billions of neurons with a corresponding increase in magnitude of their overall interaction and emergent behavior. A feedforward neural network is an artificial neural network where connections between the units do not form a cycle.

A deep learning neural network (DNN) is an artificial neural network (ANN) with multiple hidden layers of units between the input and output layers. Similar to shallow ANNs, DNNs can model complex non-linear relationships. DNN architectures, e.g., for object detection and parsing, generate compositional models where the object is expressed as a layered composition of image primitives. The extra layers enable composition of features from lower layers, giving the potential of modeling complex data with fewer units than a similarly performing shallow network. DNNs are typically designed as feedforward networks.

In machine learning, a convolutional neural network (CNN or ConvNet) is a type of feed-forward ANN in which the connectivity pattern between its nodes (neurons) is inspired by the organization of the animal visual cortex, whose individual neurons are arranged to respond to overlapping regions tiling a visual field. Convolutional networks mimic biological processes and are configured as variations of multilayer perceptrons designed to use minimal amounts of preprocessing while processing data, such as digital images. Thus, a CNN is a class of DNN that is commonly applied to analyzing visual imagery. In the field of computer vision, convolutional neural networks excel at image classification, which consists of categorizing images, given a set of classes, and having the network determine the strongest class present in the image.

In recent years, region-convolutional neural networks (R-CNNs) have been developed to deal with the tasks of object detection (e.g., microelectronic device inspection and defect detection), localization and classification. In general, a R-CNN is a special type of CNN that is able to locate and detect objects in images. The output of the R-CNN is generally a set of bounding boxes that closely match each of the detected objects, as well as a class output for each detected object. In certain of the present embodiments, one or more of these deep learning neural networks can be used to aid in process of training a defect detection module.

In order to understand the limitations with the single model defect detection system, the following hypothetical example is presented. In this example, defect inspection is performed using just the single model developed in step 402 of FIG. 4, and the single model is created using six different defect types (i.e., d1 . . . d6). After the single model is created, a first image containing an actual defect d3 is processed through the single model to determine whether or not the system can accurately recognize and classify the defect. However, there is a problem with the single model defect detection method, because in the electronics industry there are certain defect types that tend to be quite similar in many respects. In this hypothetical example, assume that defect type d2 is quite similar to defect type d3, and that none of the other defect types d1, d4, d5 and d6 are similar to either d2 or d3. Thus, when analyzing the first image, the single model defect detection system assigns a probability that the defect in the first image is a type d1 defect, or a type d2 defect, or a type d3 defect, or a type d4 defect, or a type d5 defect, or a type d6 defect. Because the defect types d1, d4, d5 and d6 are so dissimilar from the actual defect d3 in the first image, the single model would determine a relative low probability score (e.g., 2-5%) that the d3 defect was a type d1, d4, d5 or d6 type. However, when assigning a probability that the actual d3 defect in the first image is a type d3 defect, the system assigns a lower probability than may be expected. This is because the single model determines that although there is a defect in the first image, it could either be a type d2 defect or a type d3 defect (i.e., because the type d2 defects are similar to the type d3 defects). As such, the single model may determine for example, that there is a 43% probability that the defect in the image is a type d3 defect (which it actually is), and that there is a 40% probability that the defect in the image is a type d2 defect (which it is not). The single model defect detection system determines that the actual defect in the first image is very similar to both the type d2 defect class and the type d3 defect class, but it does not know with high confidence which type it is, because it could be either one. If there is, for example, a 70% probability threshold for determining whether or not to confirm a particular defect (the threshold could be any suitable value), the single model defect detection algorithm would fail to identify the type d3 defect in the first image as an actual defect (i.e., because it could not be confident as to what type of defect it was between the d2 and d3 defect classes). In other words, the result of processing the first image through the single model defect detection algorithm would be that there are no defects. This is problematic because there actually was a defect in the first image, and the system could not identify the type of defect with a high enough confidence level. The multi model defect detection systems of the embodiments described herein address these limitations that are associated with the single model system.

Referring again to FIG. 4, in certain embodiments, in step 404, for each image input into the single model, the method includes generating a probability array for a defect in the image. This process includes processing a plurality of defects with the single model for each of the different defect types and determining the likelihood that the actual defect is a type d1 . . . d10 defect. As shown in the nonlimiting example of Table 1 below, one image including a d5 type defect is processed by the single model.

TABLE 1

| Probability | d1 | d2 | d3 | d4 | d5 | d6 | d7 | d8 | d9 | d10 |
|---|---|---|---|---|---|---|---|---|---|---|
| 1 image of d5 | 2% | 2% | 2% | 25% | 30% | 25% | 3% | 3% | 3% | 5% |

As shown in Table 1 above, the single model has determined that the subject d5 type defect in the image has a very low probability (2-5%) of being any of defect types d1, d2, d3, d7, d8, d9 and d10. Thus, the d5 defect is not similar to these other defect types. In contrast, there is a 25% probability that the analyzed d5 is a type d4 defect, and a 25% probability that the analyzed d5 defect is a type d6 defect. Thus, the d5 defect is rather similar to the d4 and d6 defect types. It should be noted that in this example, the single model defect detection algorithm determines that there is a 30% probability that the d5 defect in the image is a d5 defect, which is the highest probability among the ten different defect types. As mentioned in the previous example, this low probability reveals the limitations of the single model method.

In step 404, a plurality of images (M images) are input into the single model for each of the ten defect types. Thus, for M images of each defect type, an M*10 probability array is generated.

In step 406, for each defect type, the method includes computing a correlation with other defects through the probability arrays associated with the input images. One nonlimiting example of the results of these computed correlations is shown below in Table 2.

TABLE 2

|  | d1 | d2 | d3 | d4 | d5 | d6 | d7 | d8 | d9 | d10 |
|---|---|---|---|---|---|---|---|---|---|---|
| d1 | 1 | 0.9 | 0.8 | 0.1 | 0.1 | 0.1 | 0.1 | 0.1 | 0.1 | 0.1 |
| d2 | 0.8 | 1 | 0.9 | 0.2 | 0.2 | 0.2 | 0.2 | 0.2 | 0.2 | 0.2 |
| d3 | 0.9 | 0.9 | 1 | 0.1 | 0.1 | 0.1 | 0.1 | 0.1 | 0.1 | 0.1 |
| d4 | 0.1 | 0.1 | 0.1 | 1 | 0.8 | 0.8 | 0.1 | 0.1 | 0.1 | 0.1 |
| d5 | 0.1 | 0.1 | 0.1 | 0.9 | 1 | 0.9 | 0.2 | 0.2 | 0.2 | 0.2 |
| d6 | 0.2 | 0.2 | 0.2 | 0.8 | 0.9 | 1 | 0.1 | 0.1 | 0.1 | 0.1 |
| d7 | 0.1 | 0.1 | 0.1 | 0.1 | 0.1 | 0.1 | 1 | 0.9 | 0.8 | 0.1 |
| d8 | 0.1 | 0.1 | 0.1 | 0.1 | 0.1 | 0.1 | 0.8 | 1 | 0.9 | 0.2 |
| d9 | 0.2 | 0.2 | 0.2 | 0.2 | 0.2 | 0.2 | 0.9 | 0.8 | 1 | 0.1 |
| d10 | 0.2 | 0.2 | 0.2 | 0.2 | 0.2 | 0.2 | 0.1 | 0.2 | 0.1 | 1 |

As shown in the example of Table 2 above, the correlations indicate how similar one defect type is to another defect type. For example, defect type d1 has a 100% correlation with defect type d1, as they are the same defect type. Looking at defect types d1, d2 and d3 in Table 2, it can be seen that these three defect types have a relatively high correlation with each other, with correlation percentages ranging from 80% to 100%. Similarly, looking at defect types d4, d5 and d6 in table 2, it can be seen that these three defect types also have a relatively high correlation with each other, with correlation percentages also ranging from 80% to 90%. Also, looking at defect types d7, d8 and d9, in table 2, it can be seen that these three defect types also have a relatively high correlation with each other, with correlation percentages also ranging from 80% to 90%. For defect type d10, this defect type does not have a high correlation with any other defect type (i.e., defect types d1 to d9), with correlation percentages ranging from 10% to 20%. As such, there are four different groups of defect types that have a high correlation with each other, namely a first group including defect types d1, d2 and d3, a second group including defect types d4, d5 and d6, a third group including defect types d7, d8 and d9, and a fourth group including only defect type d10. In certain examples, a relatively high correlation of a defect type with other defect types is above 50%, or above 75%, or above 90%, whereas a relatively low correlation of a defect type with other defect types is below 50%, or below 25%, or below 10%.

In certain embodiments, a correlation threshold (e.g., an $\epsilon$ of 0.8) is used to determine whether defects are similar defects or dissimilar defects. For example, if the correlation value of d1 and d2 Corr(d1,d2)>$\epsilon$, they are determined to be similar defects. Also, if the correlation value of d1 and d2 Corr(d1,d2)<$\epsilon$, they are determined to be dissimilar defects. It should be appreciated that the correlation threshold for determining similar defects can be any suitable value other than 0.8.

Referring again to FIG. 4 and step 408, in certain embodiments, the method includes generating a plurality of groups of defect types, each defect type in a particular group having a low correlation with each of the other defects in said group. In certain embodiments, the defect types for each group are selected in such a way that the defect type has a minimum possible correlation with the other defect types. In other words, the groups are designed such that the particular defects in each group are as dissimilar as possible.

In step 410, in certain embodiments, the method includes training a plurality of different models, each model being based on one of the groups of defect types. This training can be a process that is similar (or the same) to the process that was used for training the original single model (e.g., a deep learning neural network training algorithm). However, when training one of the multi-models, only images with defect types that are part of that group are used for training purposes. In one example, a first one of the multi-models includes defect types d1, d4 and d7, a second one of the multi-models includes defect types d2, d5 and d8, and a third one of the multi-models includes defect types d3, d6, d9 and d10. When performing training with the first one of the multi-models, only images containing defect types d1, d4 and d7 are used. The same concept applies to training the second and third multi-models.

Figure 5:
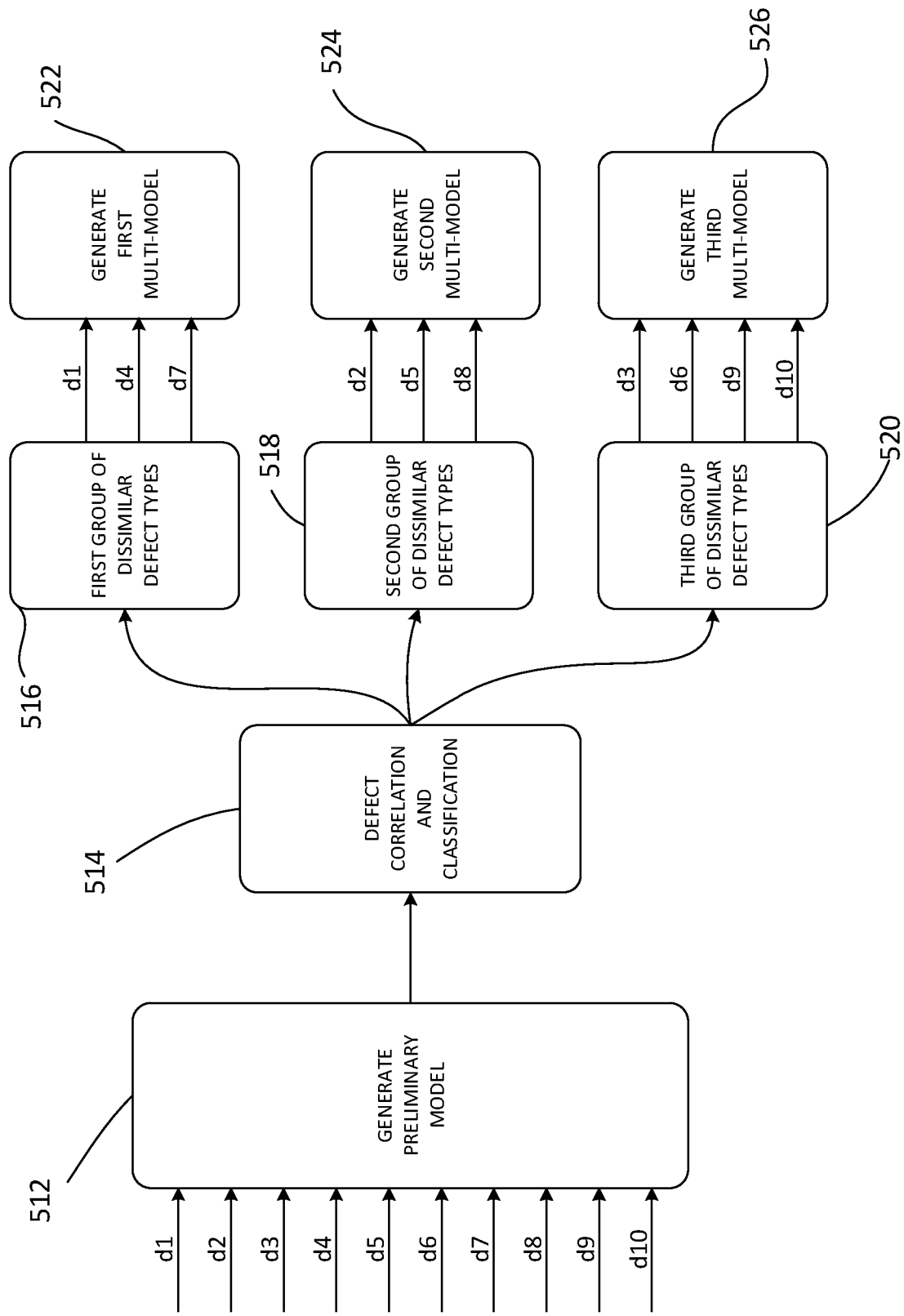
FIG. 5 is a block diagram for a method of generating multiple models for defect inspection, according to embodiments.

Referring now to FIG. 5, this figure shows a graphical representation of the process of training the multi-models according the method discussed above with regard to FIG. 4. In FIG. 5, a plurality of images with defect types d1 to d10 are used to generate the preliminary single model 512 (e.g., as in step 402 of FIG. 4). Using this preliminary single model 512, the system performs defect correlation and classification 514 as discussed above to generate the first group of dissimilar defect types 516 (which includes defect types d1, d4 and d7), the second group of dissimilar defect types 518 (which includes defect types d2, d5 and d8), and the third group of dissimilar defect types 520 (which includes defect types d3, d6, d9 and d10) (e.g., as in step 408 of FIG. 4). After these groups of defect types have been determined, a plurality of images including defects of type d1, d4 and d7 are used to train the first multi-model 522, a plurality of different images including defects of type d2, d5 and d8 are used to train the second multi-model 524, and a plurality of different images including defects of type d3, d6, d9 and d10 are used to train the third multi-model 526 (e.g., as in step 410 of FIG. 4). At this point, the multi-models have been trained and are ready to use for defect inspection. It should be appreciated that the number of groups of dissimilar defect types is not limited to three as in the example described above and can be any suitable number. In certain embodiments, the number of groups of dissimilar defect types is large enough such that in each group there are no similar types of defects.

Figure 6:
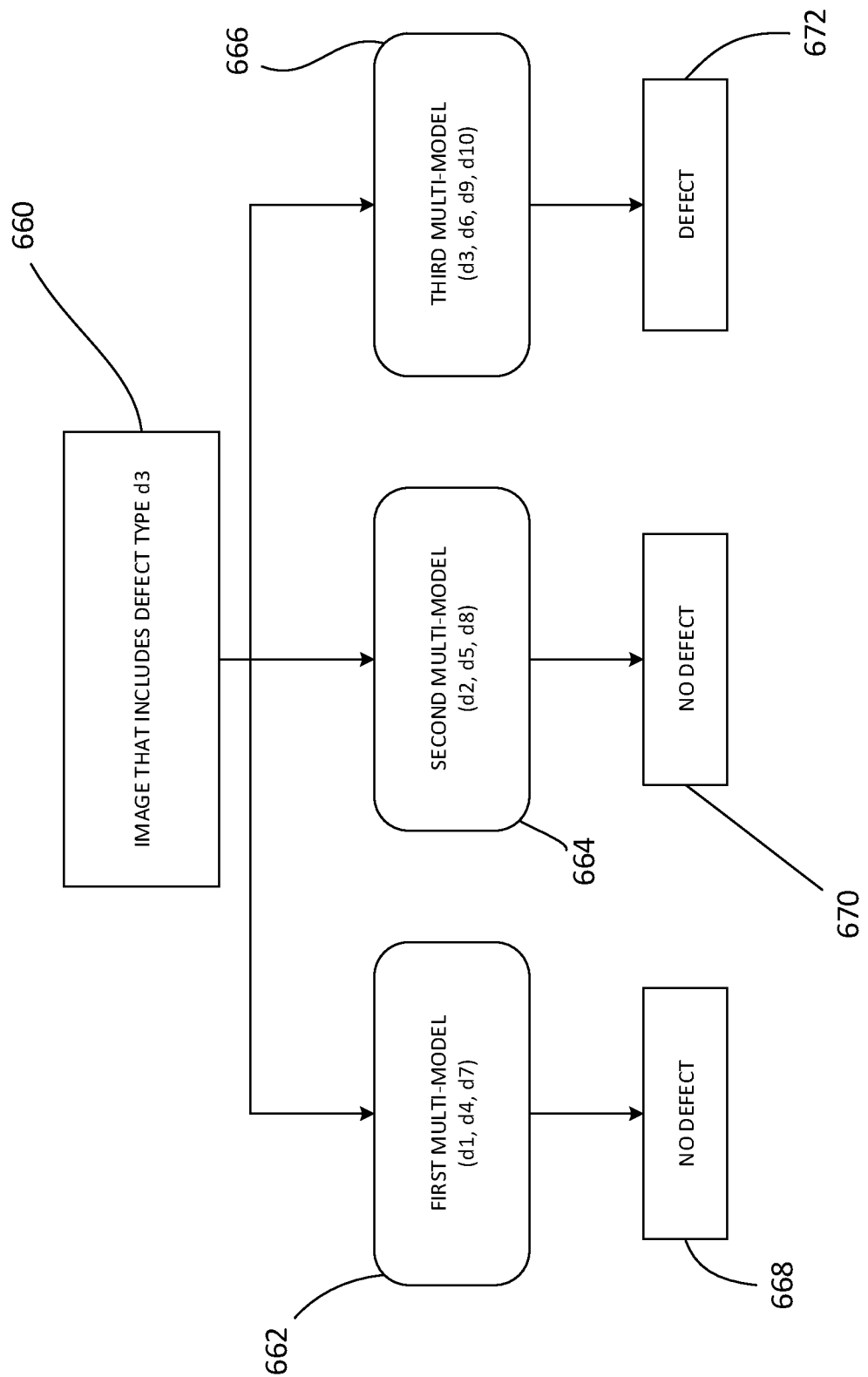
FIG. 6 is a block diagram for a method of detecting defects using the multiple models that were generated in FIG. 5.

Referring now to FIG. 6, in certain embodiments, an image including a defect is processed by each of the different multi-models. In particular, in this example, a d3 image 660 that includes a defect of type d3 is separately processed by the first multi-model 662, the second multi-model 664, and the third multi-model 666.

In this example, the first multi-model 662 processes the d3 image 660 and determines 668 that this image does not have a defect having a type from among the group including d1, d4 and d7. As was mentioned earlier, the type d3 defect has similarities to the type d1 defect (i.e., which is one of the defect types in the first multi-model 662). However, even assuming that the first multi-model 662 determines that there is a relatively high probability (e.g., 65% or 0.65) that the d3 image 660 includes a type d1 defect, this probability would not be above the threshold necessary to conclude that there is a defect of this type (e.g., Corr(d1,d3)<$\varepsilon$, where $\varepsilon$ is 0.8).

Also, in this example, the second multi-model 664 processes the d3 image 660 and determines 670 that this image does not have a defect having a type from among the group including d2, d5 and d8. As was mentioned earlier, the type d3 defect has similarities to the type d2 defect (i.e., which is one of the defect types in the second multi-model 664). However, even assuming that the second multi-model 664 determines that there is a relatively high probability (e.g., 70% or 0.70) that the d3 image 660 includes a type d2 defect, this probability would not be above the threshold necessary to conclude that there is a defect of this type (e.g., Corr(d2, d3)<$\varepsilon$, where $\varepsilon$ is 0.8).

Also, in this example, the third multi-model 666 processes the d3 image 660 and determines 672 that this image does have a defect having a type from among the group including d3, d6, d9 and d10. In this example, the third multi-model 666 determines that there is a high probability (e.g., 85% or 0.85) that the d3 image 660 is actually a type d3 defect, and this probability is above the threshold necessary to conclude that there is a defect of this type (e.g., Corr(d3, d3)>$\varepsilon$, where $\varepsilon$ is 0.8).

In certain embodiments, the system compares the probabilities from the output of the three multi-models and assigns the defect type having the highest probability. In the example above, there was a 65% probability of the defect in the image 660 being a type d1 defect according to the first multi-model 662, there was a 70% probability of the defect in the image 660 being a type d2 defect according to the second multi-model 664, and there was a 85% probability of the defect in the image 660 being a type d3 defect according to the third multi-model 666. In these embodiments, even though 65%, 70% and 85% are all generally high confidence levels, the 85% confidence level produced by the third multi-model 666 is the highest, and therefore the defect is classified as a type d3 detect.

As such, the present embodiments including the multi-models for defect detection are able to determine with a higher level of confidence not only that a defect exists in the image, but also more accurately determine the type of defect. As discussed above, one of the limitations with the related single model of detection is that there were several similar defect types within the model, leading to a lower confidence level of determining a particular defect type. However, in the present embodiments, because each model only includes dissimilar defect types, there is a higher confidence level in determining the defect type.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions.

The descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating training models for object detection, the method comprising:
   generating a preliminary training model based on a group of first images, the first images including a plurality of different types of objects;
   processing a group of second images with the preliminary training model to generate a probability array for each of the second images, the probability array indicating for each type of object the likelihood that an object in the respective second image is a particular type of object;
   generating correlations between the different types of objects based on the probability arrays;
   generating a plurality of object groups based on the correlations, where each object group includes a plurality of different types of objects, and each type of object in a given object group has a relatively low correlation with the other types of objects in the same object group; and
   for each object group, generating a final training model based on a group of third images, the third images each including an object having an object type corresponding to one of the object types in the respective object group.

2. The method according to claim 1, wherein the objects are defects in an electronics device.

3. The method according to claim 1, wherein the correlations indicate a similarity of a first type of object with a second type of object.

4. The method according to claim 1, wherein generating the plurality of object groups includes assigning any object types having high correlations with each other to different object groups.

5. The method according to claim 1, further comprising classifying the defect types based on their respective correlations.

6. The method according to claim 1, wherein generating the preliminary training model, and the final training models is performed with a deep learning neural network.

7. The method according to claim 1, wherein a number of object groups generated based on the correlations is a minimum number of object groups that separates each type of object that has a relatively high correlation with the other types of objects.

8. A computer system comprising:
   one or more computer readable storage media with program instructions collectively stored on the one or more computer readable storage media; and
   one or more processors configured to execute the program instructions to perform a method for generating a training model for object detection, the method comprising:
   generating a preliminary training model based on a group of first images, the first images including a plurality of different types of objects;
   processing a group of second images with the preliminary training model to generate a probability array for each of the second images, the probability array indicating for each type of object the likelihood that an object in the respective second image is a particular type of object;
   generating correlations between the different types of objects based on the probability arrays;
   generating a plurality of object groups based on the correlations, where each object group includes a plurality of different types of objects, and each type of object in a given object group has a relatively low correlation with the other types of objects in the same object group; and
   for each object group, generating a final training model based on a group of third images, the third images each including an object having an object type corresponding to one of the object types in the respective object group.

9. The computer system according to claim 8, wherein the objects are defects in an electronics device.

10. The computer system according to claim 8, wherein the correlations indicate a similarity of a first type of object with a second type of object.

11. The computer system according to claim 8, wherein generating the plurality of object groups includes assigning any object types having high correlations with each other to different object groups.

12. The computer system according to claim 8, further comprising classifying the defect types based on their respective correlations.

13. The computer system according to claim 8, wherein generating the preliminary training model, and the final training models is performed with a deep learning neural network.

14. The computer system according to claim 8, wherein a number of object groups generated based on the correlations is a minimum number of object groups that separates each type of object that has a relatively high correlation with the other types of objects.

15. A computer program product for generating training models for object detection, the computer program product comprising:
one or more computer readable storage media, and program instructions collectively stored on the one or more computer readable storage media, the program instructions comprising:
generating a preliminary training model based on a group of first images, the first images including a plurality of different types of objects;
processing a group of second images with the preliminary training model to generate a probability array for each of the second images, the probability array indicating for each type of object the likelihood that an object in the respective second image is a particular type of object;
generating correlations between the different types of objects based on the probability arrays;
generating a plurality of object groups based on the correlations, where each object group includes a plurality of different types of objects, and each type of object in a given object group has a relatively low correlation with the other types of objects in the same object group; and
for each object group, generating a final training model based on a group of third images, the third images each including an object having an object type corresponding to one of the object types in the respective object group.

16. The computer program product according to claim 15, wherein the objects are defects in an electronics device.

17. The computer program product according to claim 15, wherein the correlations indicate a similarity of a first type of object with a second type of object.

18. The computer program product according to claim 15, wherein generating the plurality of object groups includes assigning any object types having high correlations with each other to different object groups.

19. The computer program product according to claim 15, further comprising classifying the defect types based on their respective correlations.

20. The computer program product according to claim 15, wherein generating the preliminary training model, and the final training models is performed with a deep learning neural network.

\* \* \* \* \*